United States Patent [19]

Varner

[11] 4,141,225
[45] Feb. 27, 1979

[54] ARTICULATED, FLEXIBLE SHAFT ASSEMBLY WITH AXIALLY LOCKABLE UNIVERSAL JOINT

[75] Inventor: Horace M. Varner, Littleton, Colo.

[73] Assignee: The United States of America as represented by the Secretary of the Interior, Washington, D.C.

[21] Appl. No.: 767,260

[22] Filed: Feb. 10, 1977

[51] Int. Cl.² .............................................. F16C 1/02
[52] U.S. Cl. .......................................... 64/2 P; 64/7; 403/353; 175/57
[58] Field of Search ....................... 64/31, 2 P, 9 R, 4; 403/353, 359; 175/81, 57, 78, 61, 52

[56] References Cited
U.S. PATENT DOCUMENTS

| 897,349 | 9/1908 | Coates | 64/2 P |
| 1,201,562 | 10/1916 | Cooper | 64/2 P |
| 3,054,275 | 9/1962 | Ongaro | 64/9 R |
| 4,062,412 | 12/1977 | McIlvanic | 175/78 |

Primary Examiner—Samuel Scott
Assistant Examiner—G. A. Anderson
Attorney, Agent, or Firm—Gersten Sadowsky; Donald A. Gardiner

[57] ABSTRACT

An articulated shaft assembly particularly useful in forming a flexible drill for drilling vertical holes in a mine shaft roof employs interengaging shaft sections whose opposed ends form a ball and socket mating surface connection with a plurality of driving members interposed between opposed spherical surfaces and with the driving members locking the shaft in axial alignment for torque transmission in one direction while permitting torque transmission in the other direction with the shafts angularly misaligned.

13 Claims, 17 Drawing Figures

ARTICULATED, FLEXIBLE SHAFT ASSEMBLY WITH AXIALLY LOCKABLE UNIVERSAL JOINT

FIELD OF THE INVENTION

This invention relates to an articulated, flexible shaft assembly and more particularly to such an assembly employing a universal joint during constant speed rotation of the flexible shaft assembly formed thereby.

BACKGROUND OF THE INVENTION

The drilling of vertical roof bolt holes in underground mines whose mine seam is but several feet in height prevents the utilization of drills having extended rigid vertical drill shafts to effect the drilling of roof bolt holes of a length longer than that of the seam due to the limitations presented by the existing vertical height of the mine shaft. While it is possible, where the bolt holes are to be of a greater length than the seam or shaft height, that the operator may manually change or add sections to the drill steel at the drill head, such manual change takes considerable amount of time and adds to the existing hazards to the operator, particularly in low coal. Such hazzards are caused by the necessity to work under unsupported roofs and the handling of highly stressed rotating parts.

SUMMARY OF THE INVENTION

The present invention is directed to an articulated, flexible shaft assembly, particularly applicable to a flexible drill consisting of multiple, linked shaft sections permitting the drill to lock up straight when torqued in one direction and freely articulate when torqued in the opposite direction. Specifically, the articulated, flexible shaft assembly comprises at least one first shaft section terminating at one end in a spherical male member and a second shaft section terminating at the opposed one end in a female member bearing a spherical recess of corresponding size with the shafts being linked by reception of the male member within the female member. A plurality of driving/locking members are interposed, within the spherical interface, between the spherical faces of the male and female members for effecting driving engagement between the members. The improvement resides in providing mating surfaces between at least one of the male and female members and the driving members for effecting constant velocity transmission of torque between the shafts with their axes misaligned when torqued in one direction and for locking the two spherical members in axial alignment for torque transmission in the other direction. Means are provided for preventing separation of the shaft sections under applied tension between the sections which may take the form of a force fit snap bead carried by the spherical face of the female member.

When the articulated, flexible shaft assembly is employed to form a flexible drill for operation in conjunction with a drill head whose axis is vertical and which faces the roof of a mine shaft roof through which the articulated shaft assembly projects and by which it is clamped radially for torquing in either a clockwise or counterclockwise direction, the drill configuration allows the drill to operate as a strong straight drill above the drill drive head which feeds the drill to produce a straight vertical hole in the mine roof, while the tail end of the drill beneath the drill drive head may ride within a curved tube with the shaft sections angulated with respect to each other so that the articulated shaft assembly may clear the floor of a low coal mine.

DESCRIPTION OF THE PREFERRED EMBODIMENTS

In the various embodiments, like elements are given like numerical designations.

Figure 1:
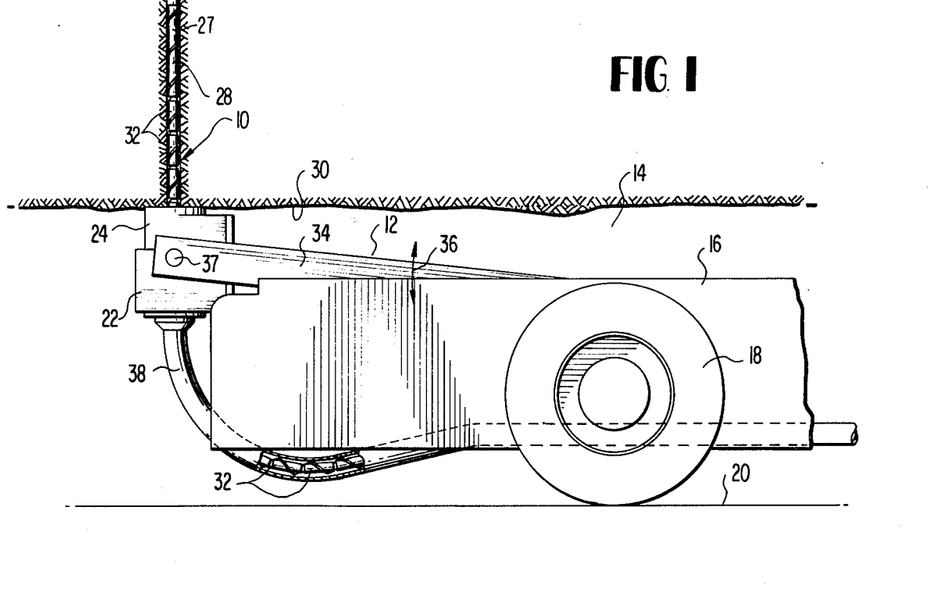
FIG. 1 is a vertical elevational view, partially in section, of a mine drilling machine employing a vertically oriented drill head for drilling roof bolt holes in underground mines using a rotary drill incorporating the articulated, flexible shaft assembly with axially lockable universal joints forming a general embodiment of the present invention.

Reference to FIG. 1 shows the articulated, flexible shaft assembly with axially lockable universal joint indicated generally at 10 as being employed in conjunction with a mining machine 12 employed in the drilling of roof bolt holes in an underground mine 14 which may be of the general height of a seam of coal or the like, the machine 12 having an overall vertical height somewhat less than that of the mine 14 and consisting of a chassis 16 mounted for movement on wheels 18 over the floor 20 of the mine 14. Mounted to the forward end of the chassis 16 is a drill drive head 24 which is for driving the articulated, flexible shaft assembly 10 which passes through the center of drill head 24 for rotation about a vertical axis, the articulated, flexible shaft assembly 10 terminating at one end in a drill bit 26 which is shown as having formed a vertical hole 28 within the mine roof 30. Shaft assembly 10 comprises a number of articulated shaft sections 32 which are mechanically linked together. The drill head 24 is mounted to the chassis 16 by way of paired arms 34 and a horizontal pivot axis defined by pins 37 fixed to the drill head 24 and rotatably projecting horizontally through the ends of arms 34. A mechanism (not shown) may be employed for raising and lowering the head 24 relative to the mine roof 30 by pivoting the arms 34 as indicated by a double headed arrow 36. A curved tube 38 depends from the bottom of the head 24 and extends rearwardly through the chassis 16, the tube 38 being broken away to illustrate the linked articulated shaft sections 32 which extend from the drill bit 26, by way of starter element 27 through the rotary drill drive head 24 and through a given length of tube 38 depending upon the desired vertical height of the drilled hole 28 within the mine roof.

As will be described later, the articulated flexible shaft assembly will lock up straight when torqued in a clockwise direction as seen from the drill head 24 facing drill bit 26 and will freely articulate when torqued in a counterclockwise direction. Thus, the articulated flexible shaft assembly allows the drill (formed by the articulated shaft sections and the drill bit) to operate as a strong straight drill above the drill drive head 24, to produce a straight vertical hole as at 28 in the mine roof (for example) while the tail end of the drill, that is, that portion of the articulated flexible shaft assembly 10 beneath the drill drive head 24 rides in the curved tube to clear the floor 20 of a low coal mine. Since the tail of the drill now is running horizontally in the mine, the length of the drill is unimportant from a clearance standpoint. The minimum vertical height required for the operation of the drill with the flexible shaft assembly is a function of the drive head height, the allowable articulation angle of the flexible shaft section joints, and the length of each drill length or shaft section from joint center line to joint center line.

The remaining figures show multiple embodiments of the articulated, flexible shaft assembly with axially lockable universal joints of the present invention which have particular application to use as a segmented drill for the drilling of vertical holes within the roof of coal mines or the like. In that respect, reference may now be had to the embodiment of the invention which is shown in FIGS. 2–6 inclusive. This embodiment of the invention constitutes shaft sections 32 which are of two part construction, that is, they each comprise an outer sleeve member 32a and an inner core member 32b. The outer sleeve member 32a terminates at one end in a socket member 42 which includes a spherical inner surface 44 which faces a ball member 46 forming a spherical end portion of core member 32b for the adjacent shaft section 32. In this embodiment, the ball and socket members 42 and 46 define a universal joint which, as mentioned previously, is selectively locked so that the shaft sections are in axial alignment and form a straight shaft portion such as that illustrated within the drilled hole 28 in FIG. 1 during rotation in one direction, or are in free universal joint condition permitting angular orientation of the adjacent shaft sections as seen within that portion of tube 38 which is broken away, FIG. 1, when rotated in the opposite direction. In that regard, the socket member 42 is provided with internal, locking/driving pockets indicated generally at 48, FIG. 2, while the ball member 46 of core member 32b is provided with a plurality of male locking/driving lugs indicated generally at 50 which comprise radial projections and whose radially outer surfaces 50a define mating spherical surfaces for the spherical bearing surface 44 of socket member 42. Further, the core member 32b comprises a plurality of alternating longitudinally extending ribs 52 and slots or grooves 54 which form a spline connection with oppositely configured and positioned spline ribs 56 and slots or grooves 58, respectively on the inner periphery of sleeve member 32a of the same shaft section 32. The internal locking/driving pockets 48 are actually formed within ribs 56 of the sleeve member 32a. The core member 32b is prevented from shifting axially relative to the sleeve member 32a for each shaft section. In the case of the embodiment of FIGS. 2–6 inclusive, a hole 60 is bored transversely through the sleeve member 32a, FIG. 4, and a portion of the core member and a locking pin 62 in the form of a hollow, split and expandable metal tube is inserted within hole 60 by compressing the tubular locking pin slightly and, upon expansion, locks itself within hole 60 and prevents axial shifting of the two parts of shaft section 32. Alternatively, as shown in FIG. 7, a radial hole 64 may be drilled into the sleeve member 32a and the two parts may be welded together by means of weld material 66 which simply fills the hole to lock the internal members together.

Figure 4:
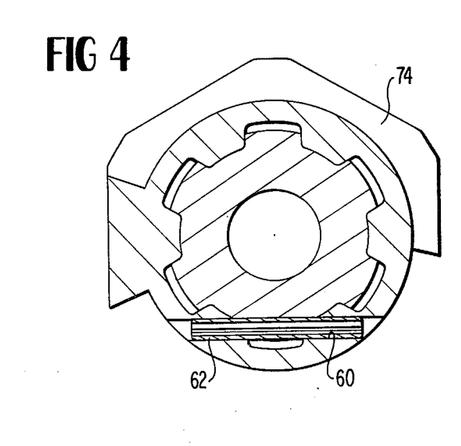
FIG. 4 is a transverse sectional view of a portion of the assembly of FIG. 3 taken about lines 4—4.
Figure 5:
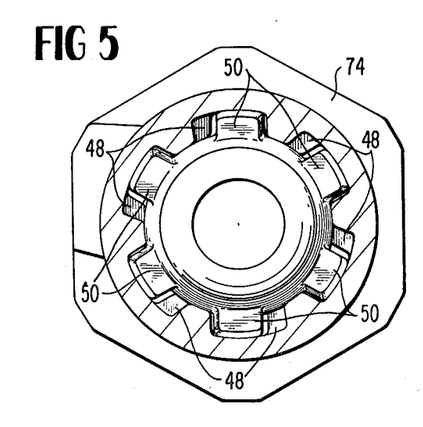
FIG. 5 is a transverse sectional view of a portion of the assembly of FIG. 3 taken about lines 5—5.
Figure 6:
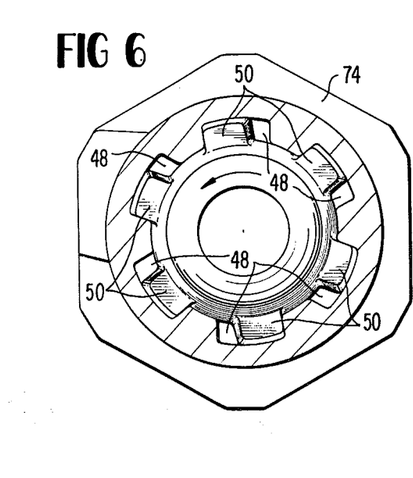
FIG. 6 is a similar sectional view to that of FIG. 5 showing a core member of one section rotated relative to the sleeve member of a second section to axial, in line locking/driving position.
Figure 7:
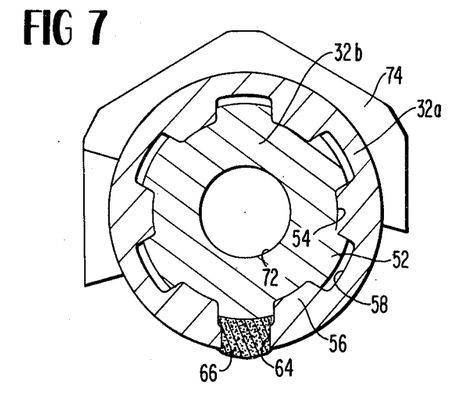
FIG. 7 is a transverse sectional view of one shaft section of the articulated, flexible shaft assembly of the present invention in alternate form.

It should be remembered that FIG. 4 is a transverse sectional view through one of the shaft sections 32, while FIGS. 5 and 6 are transverse sectional views at the point where the ball and socket connection is made between the end of a sleeve member 32a of one shaft section and the end of a core member 32b of the adjacent shaft section 32. At this point, respective members define an axially lockable universal joint for respective shaft sections. Thus, a spherical universal joint bearing surface interface allows the ball member 46 to rotate off axis relative to the outer socket member 42 (in the various embodiments approximately plus and minus 10 degrees), when the joint center line, that is, a transverse plane through the center of the lugs 50 at right angles to the axis of the inner core member 32b, and the center line of the internal locking/driving pockets 48 at right angles to the axis of the outer, sleeve member 32a, are coincident, FIG. 3. Insofar as ball member 46 is concerned, the spherical surface as defined by surface portions 50a of lugs 50 is discontinuous but an extension of that surface at the tip of ball member 46 occurs at 65.

In order to transmit the thrust axially and to also permit the universal joint action, that is, the angulation of one shaft section 32 with respect to the other, the ends of the spline ribs 52 of the inner core member 32b are spherically relieved to provide a spherical bearing surface at 70, upon which the spherical tip 65 of the adjacent core member rides. Further, insofar as sleeve member 32a is concerned, it is provided at one end with a spherical, concave surface 66 on its inner periphery, while on its outer periphery at the opposite end, it is provided with a spherical bearing surface 68 which rides on concave spherical bearing surface 66 of the next adjacent shaft section sleeve member 32a.

Figure 2:
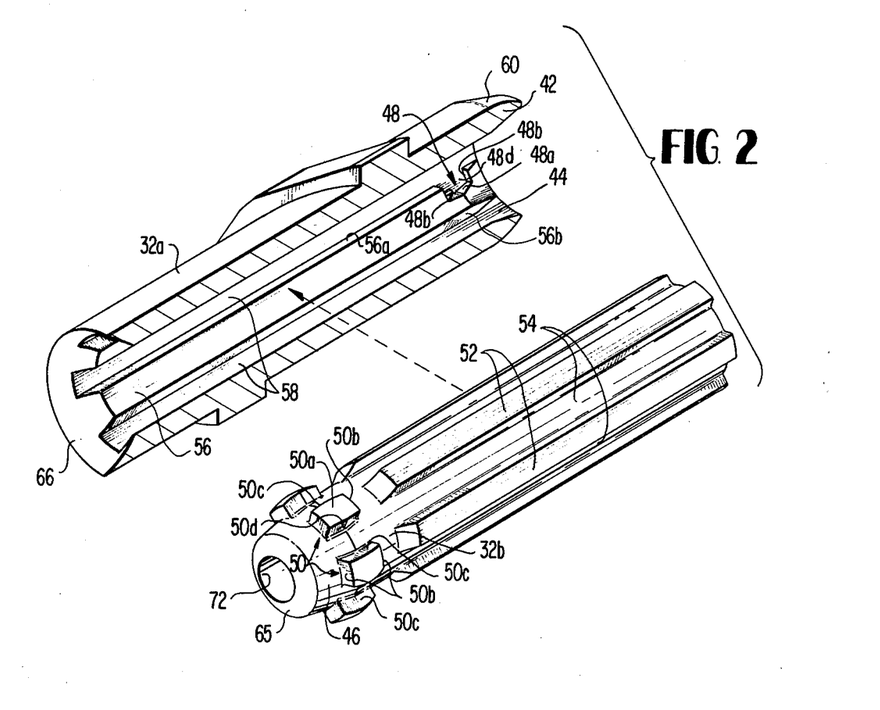
FIG. 2 is an exploded, perspective view, partially in section, of one of a two part shaft section of the multiple section, flexible shaft assembly of FIG. 1.
Figure 3:
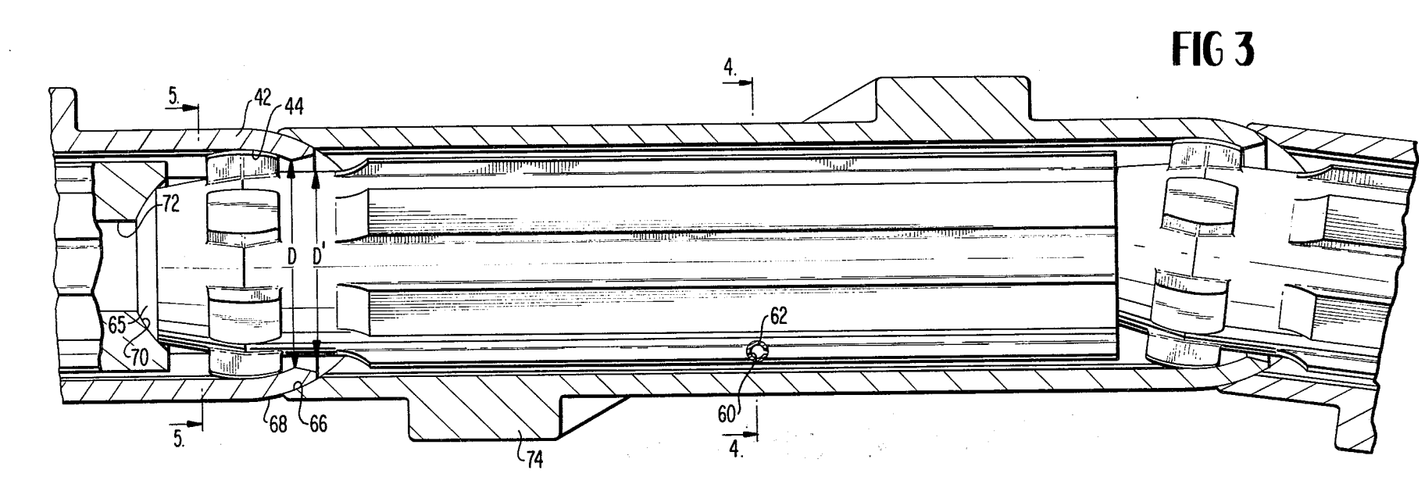
FIG. 3 is a longitudinal sectional view of a portion of the articulated, flexible shaft assembly of FIG. 1 in unlocked condition.

Referring to the internal locking/driving pockets indicated generally at 48, as noted in FIG. 2, these pockets constitute circumferential recesses within side 56a of spline ribs 56 of the sleeve member 32a and define axially opposed end walls 48b and a torque bearing surface or conical wall 48a which conforms to the conical configuration and axial length of sidewall 50d of the locking/driving lugs 50 of core member 32b of the adjacent, interconnected shaft section 32. In that regard, as further seen in FIG. 2, the lugs 50 are provided with axially opposed end walls 50b which mate with end walls 48b of pocket 48, when the core member of the downstream shaft section is rotated clockwise with respect to the immediately upstream sleeve member 32a of the shaft section, that is, the shaft section more remote from the drive head 24. When the universal joint 10 is torqued, the end walls 50b of the lugs immediately face and are in axial contact with the opposed end walls 48b of pocket 48 to axially lock the inner, core member 32b forming one element of the universal joint of one shaft section 32 to the sleeve member 32a of the adjacent shaft section 32 so that the longitudinal axis of these shaft sections are locked in a straight line. Thus, during clockwise rotation, the shaft sections 32 are axially rigid. When the two shaft sections are torqued relative to each other in the opposite direction from that described above, core member 32b rotates counterclockwise looking in the direction from the drill drive head 24 towards the drill bit 26, the lugs 50 rotate out of pockets 48, FIG. 6, to the extent that the sidewalls 50c of the locking/driving lugs contact sidewalls 56b of the sleeve member ribs 56, that is, they come into contact with the back side of the internal spline member ribs 56. Because the end walls 50b of the lugs and the end walls 48b of the pockets are now disengaged, the core member 32b of one shaft section and the sleeve member 32a of another shaft section are now free to angulate, one with respect to the other, until the center lines of respective members are at an angle which is limited by the internal diameter D of socket member 42 and the diameter D' of ball member 46 at this point for the interposed core and sleeve members of respective adjacent shaft sections. This structural arrangement acts as a limit stop for the angle of articulation of the universal joint between the two shaft sections. The angulation provided to sidewalls 50c of the ball member 46 provide clearance with sidewalls 56b of the spline ribs 56 of the sleeve member 32a so that the joint driven and driving members can rotate at a constant rotational velocity while rotating at the maximum angle of articulation. The sidewalls 50c and 50d of the locking/driving lugs of the core member and the sidewalls 48d of the locking/driving pockets of the sleeve member are given a conical configuration so that clearance is provided between these surfaces when the joint is articulated to its maximum angle.

The purpose of the internal and external splines of respective members 32a and 32b is to transmit the rotation and torque from one shaft section to the other. Locking pins 62 prevent axial disengagement of the sleeve and core members of each shaft section and separation of the chain, particularly when the chain is loaded under tension. As mentioned previously, alternatively a rosette weld may be formed as at 66, FIG. 7, to insure prevention of axial movement between members 32a and 32b for each shaft section 32.

Figure 8:
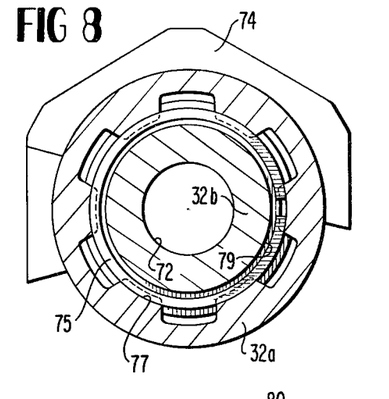
FIG. 8 is a transverse sectional view of one shaft section of the articulated, flexible shaft assembly of the present invention forming yet another embodiment of the present invention.

FIG. 8 illustrates another method of axially locking the sleeve member 32a to the core member 32b using a split retaining ring 75 which is carried partially within circumferential groove 77 of sleeve member 32a and radially opposing groove 79 of core member 32. The center of the core member may be hollow as by drilling a hole such as 72 to provide for the flow of coolant through the drill chain. It should be noted that although torque may be carried in the articulated, flexible shaft assembly comprising the shaft sections when torqued in the non-locking direction, this is not a suitable application for drilling when the shaft sections are employed for that purpose. In that respect, each shaft section 32 incorporates a helical projection on the outer periphery of sleeve member 32a as at 74 forming a cuttings removal scroll for the articulated shaft sections. Torque capability is required in the opposite direction to react all friction torques of the joints when dragging in the drill guide tube and for loosening the drill with respect to the earth formation, as when removing the articulated shaft members from drill hole 28 by rotation of the drive head 24 in a counterclockwise direction.

Turning to the embodiment of the invention shown in FIGS. 9 and 11–13 inclusive, the articulated flexible shaft assembly comprises shaft sections 32 which are unitary in form, that is, are formed as single elements, and at opposite ends, comprise unitary ball members 46 and socket members 42 respectively defining opposing spherical contact surfaces as at 80 for ball member 46 and 82 for socket member 42. The shaft sections 32 are each provided with a hexed scroll 74 in like fashion to the prior described embodiment. The spherical surface 82 which forms a recess within socket member 42, and the spherical surface 80 of ball member 46 are of essentially equal diameter such that the confronting surfaces permit the shaft sections at this point to ride on each other for universal movement when in unlocked condition.

Instead of the driving/locking members constituting integral lugs as at 50 in the prior described embodiment, the driving/locking members are separate elements and constitute balls 84 interposed between the ball and socket members of adjacent shaft sections 32. The socket member 42 in this embodiment is provided with six small diameter, radially drilled holes 88 from the outside of the shaft sections 32 radially inward, and the spherical inner surface 82 of the socket member 42 is provided with a spherical recess or enlargement 90 of holes 88, of a diameter on the order of the balls 84 so that the balls under all circumstances are partially received within the spherical enlargement 90 to the extent of approximately one-half the surface area of the balls 84. Further, the spherical surface 80 of the ball member 46 at the opposite ends of the shaft sections are peripherally relieved to create six, ball drive detent pockets indicated generally at 92 including an axially elongated double lobe or dumbell-shaped detent pocket section 94 and a circumferentially offset but axially centered, circular detent pocket section 96 which forms the drill stiffening detent or shaft stiffening detent for the shaft sections 32. The ball drive detent pocket 92 therefore comprises a multi-facet spherical depression or recess within the spherical surface 80 of the ball member 46 and cooperates with spherical recess or enlargement 90 of the adjacent shaft section 32 to jointly receive a given ball member 46. The sections are loosely linked together, in this case by a split, circular retaining ring 98 which fits within a circumferential groove 100 at the very end of socket member 42 and which ring projects radially beyond the spherical recess 82, adjacent the axial end face 102 of shaft section socket member 42. After the ball member 46 of the adjacent shaft section is inserted fully within the spherical recess 82 of socket member 42 of the adjacent shaft section to form a ball and socket connection between shaft sections, ring 98 is circumferentially expanded to allow the split to clear diameter D' of ball member 46 and is allowed to circumferentially expand into groove 100 and acts to prevent axial separation of one shaft section 32 from the other.

Figure 11:
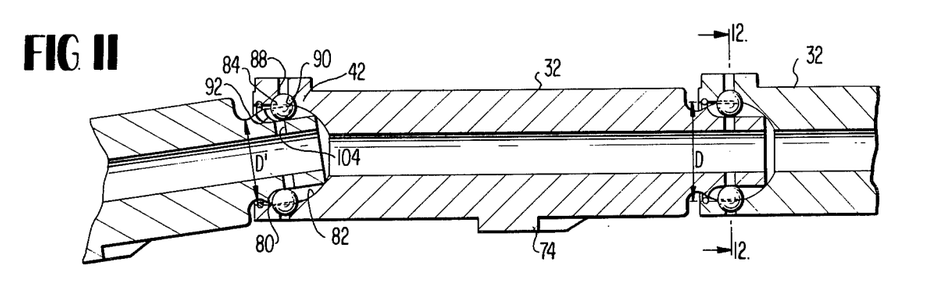
FIG. 11 is a longitudinal sectional view of the embodiment of the invention shown in FIG. 9.

Again, rotation of the shaft sections 32 in a counterclockwise direction looking inwardly from left to right, FIG. 11, causes the articulated, flexible shaft assembly 10 of this embodiment to remain in the universal joint unlocked position or condition, that is, with the balls 84 located within the double lobe pocket section 94. However, when the shaft sections 32 rotate clockwise with respect to each other, the balls shift from the position shown in FIG. 12 to the position shown in FIG. 13, whereupon the shaft sections are locked in axial alignment and angulation of the shaft sections is prevented; the balls 84 being located within the drill or shaft stiffening detent pocket section 96. Preferably, the shaft sections 32 are hollow axially by provision of axial openings or holes 72, the full extent of the same and further holes are drilled radially at six locations as at 104 at the ball member locations which open to the ball drive detent pockets 92 to further permit the coolant to flow radially through this portion of the linked shaft sections to insure freedom of movement for the balls 84 acting as the locking/driving member. In like fashion to the previously described embodiment, the angulation of the linked members 32 with respect to each other is limited when in the universal joint axial unlocked position by the extent that the neck thickness or diameter D' for the ball member 46 of the ball and socket joint is smaller than the diameter D of the spherical recess 82 within socket member 42.

Figures 9, 10:
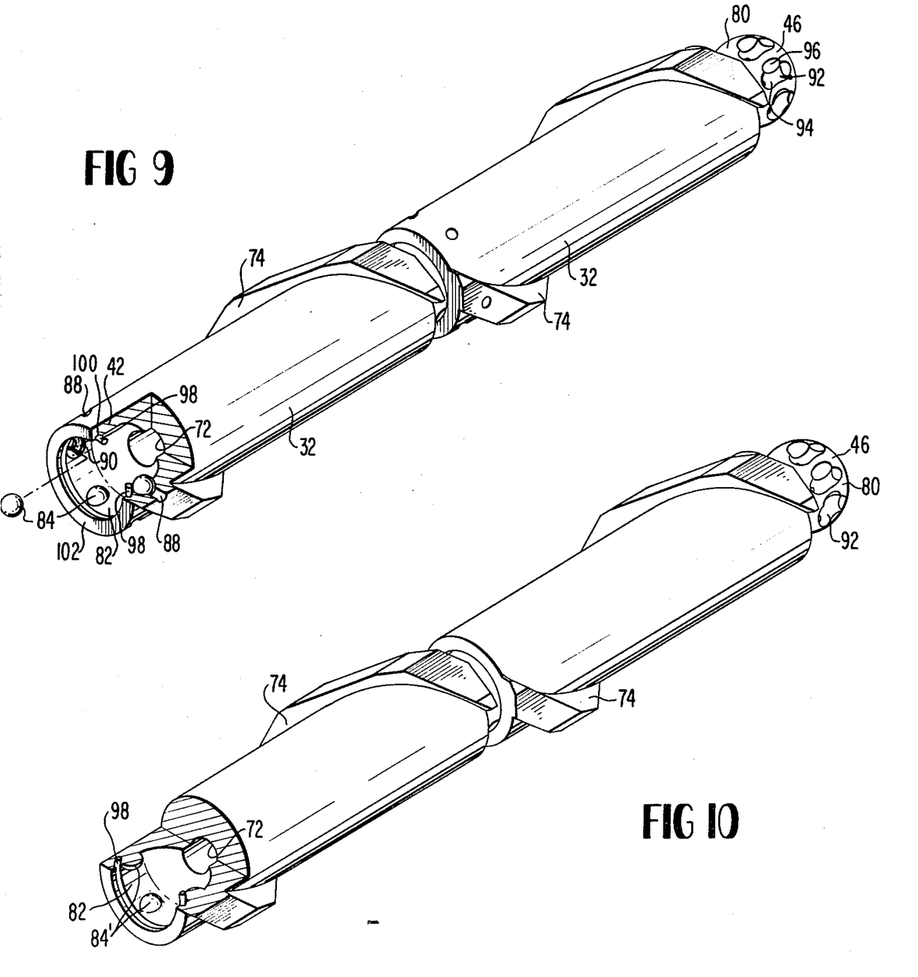
FIG. 9 is a perspective view, partially broken away, of another embodiment of the present invention.
FIG. 10 is a prespective view, partially broken away of yet another embodiment of the articulated, flexible shaft assembly of the present invention.

Referring next to FIG. 10, this embodiment of the invention is essentially identical to that of FIG. 9, with the exception that the locking/driving members do not comprise free balls as at 84, but comprise "cast in" drive balls 84' which are integral with socket member 42 of the socket sections 32, the "cast in" drive balls 84' projecting radially from the spherical recess 82 of the socket members 42 and being received within the ball drive detent pockets 92 of ball members 46 of the adjacent shaft section 32. A retaining ring 98 is carried by the socket member 42 for each shaft section in identical fashion to that of the embodiment of FIG. 9. In all other respects, the embodiment of the invention of FIG. 10 is the same as that of FIG. 9.

Turning next to FIGS. 14–17 inclusive, yet another embodiment of the invention is shown, wherein each shaft section 32 is comprised of two portions: a sleeve portion or section 32a and a core section 32b, the core section 32b, however, in this case does not extend the full axial length of sleeve section 32 but is fixed to and mounted within a counterbore 110 of the sleeve section 32a. Core section 32b constitutes a hollow cylinder and may be welded or otherwise securely fixed to sleeve section 32a at its axially inboard end 112. Further, the sleeve section 32a is characterized by longitudinally extending irregular slots 114 which extend axially inward from end 116 of sleeve member 32a, these slots forming three, somewhat flexible, circumferentially spaced fingers 118 for the sleeve member 32a.

Further, each of the fingers 118 is provided with a radially inward projecting portion 118a or rib which is convex axially and which extends the full circumferential extent of fingers 118; the diameter of the sleeve member 32a in the area of the radial projections 118 being slightly smaller than the diameter of ball member 46 of the sleeve member 32a, such that the fingers 118 flex radially slightly during axial insertion of ball member 46 within a socket member 42 of the adjacent shaft section 32. Thus, the ball and socket members interfit with a "snap fit" during axial linking of the shaft sections 32 together. Axial force is transmitted between spherical mating surfaces of the ball and socket members, the ball members 46 being provided with spherical contact surfaces 80 which match similar diameter spherical surfaces 82 of core members 32b of shaft section 32 against which they abut.

Figures 12, 13, 14, 16, 17:
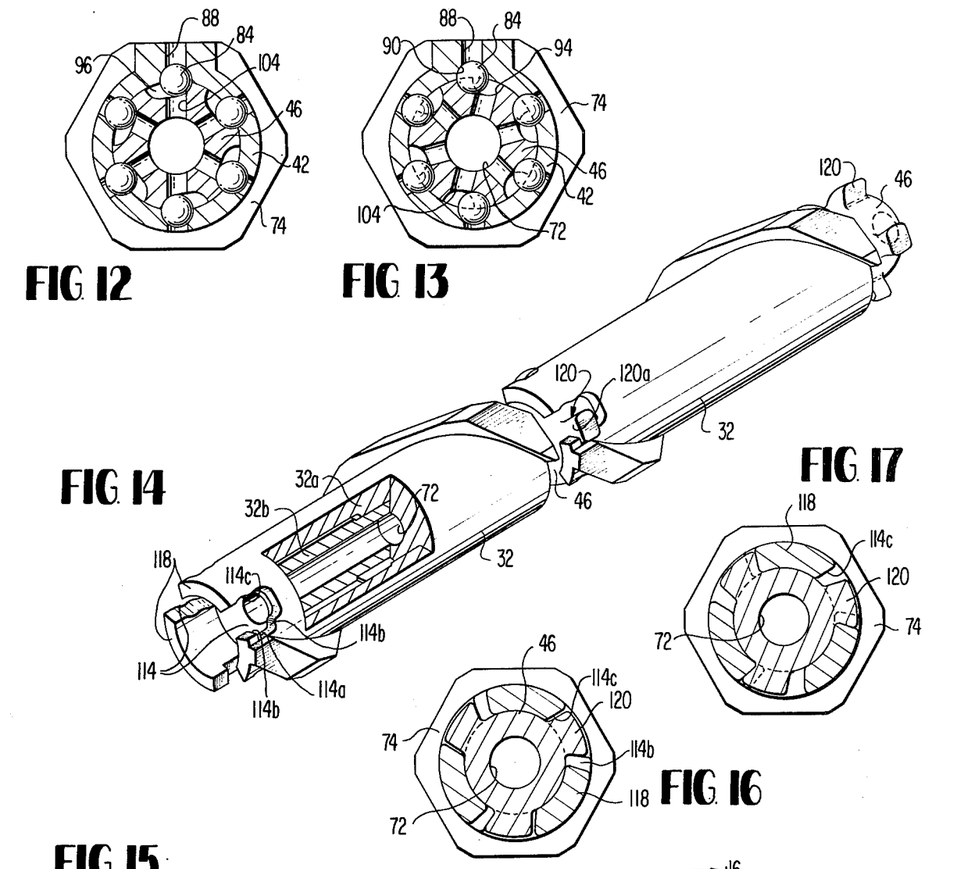
FIG. 12 is a transverse sectional view of a portion of the assembly of FIG. 11 taken about lines 12—12 with the universal joint between sections axially unlocked.
FIG. 13 is a similar sectional view to that of the assembly of FIG. 12 under universal joint axial locked conditions.
FIG. 14 is a perspective view, partially broken away, of yet a further embodiment of the present invention.
FIG. 16 is a transverse sectional view of the assembly of FIG. 15 taken about lines 16—16 under universal joint axial unlocked conditions.
FIG. 17 is a transverse sectional view of the assembly of FIG. 15 similar to that of FIG. 16 but under universal joint axial locked conditions.
Figure 15:
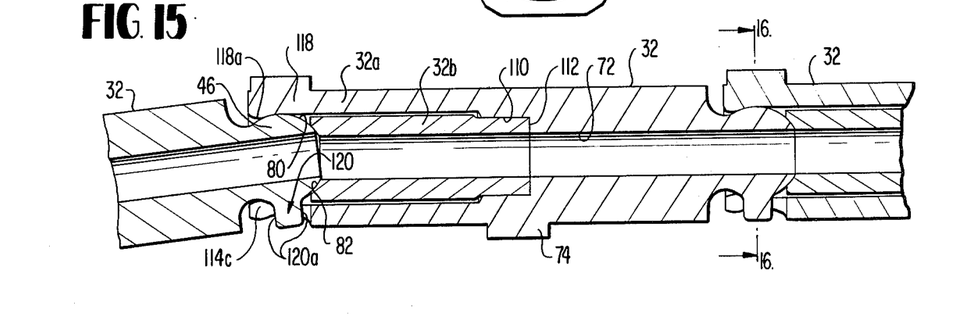
FIG. 15 is a longitudinal sectional view of the embodiment of FIG. 14 with the shaft section in locked universal joint position.

In order to effect axial locking of the shaft sections 32 together during rotation of the shaft assembly in a clockwise direction by rotating the left side shaft section 32 relative to the right side shaft section 32, FIG. 14, the elongated slots 114 which form the fingers 118 are each provided with a circumferential recess 114a which is axially intermediate of the ends of slot 114 and act to receive, during such clockwise rotation, integral radial projecting lugs indicated generally at 120 of ball members 46. Three lugs 120 are provided, the lugs having opposed axial end walls 120a which abut end walls 114b of the slot recess 114a such that in the position shown in FIG. 14 the shaft sections are prevented from angulation with respect to each other while transmitting torque therebetween in the manner of the first described embodiment of the invention, FIG. 6. The universal joint locked position may be also seen in FIG. 17, while by rotation of ball member 46 counterclockwise relative to socket member 42 from the position shown in FIG. 17 to the position shown in FIG. 16, causes end walls 120a of the locking/driving lugs 120 to rotate out of engagement with end walls 114b of recess 114a and the shaft sections may be angulated with respect to the other while still driving the one shaft section relative to the other by engagement of lugs 120 against sidewall 114c opposite recess 114a of slot 114. Slots 114 are of irregular T-shape and constitute driving/locking pockets for this embodiment while lugs 120 constitute the driving/locking members which engage the pockets.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an articulated, flexible shaft assembly for transmitting torque in response to a rotational drive means torquing said shaft,
   a plurality of shaft sections,
   ball and socket members carried on opposite ends of said shaft sections,
   ball and socket members of adjacent shaft sections being interconnected in said assembly to form a universal jointed articulated assembly,
   means interposed between the ball and socket members of said interconnected adjacent shaft sections effecting driving engagement between said shaft sections when one shaft section is rotated relative to another, said assembly having an intermediate portion, constituted by at least a shaft section which is clamped radially by said drive means for applying torquing rotation to said assembly by way of said driving engagement effecting means, said intermediate portion having interconnected therewith at a leading end thereof a shaft portion of a further portion of said assembly and at a trailing end thereof a shaft section of a still further portion of said assembly, the improvement comprising:

means interposed between said ball and socket members of said interconnected, adjacent shaft sections for causing the shaft sections of said further portion to lock up in an axial straight alignment when said assembly is torqued by rotation in one direction, and to transmit torque with a limited free angular inclination therebetween when said assembly is torqued by rotation in the other direction, whereas the shaft sections of said still further portion is caused to transmit torque with a limited free angular inclination therebetween when said assembly is torqued by rotation in the said one direction.

2. The articulated, flexible shaft assembly as claimed in claim 1, further comprising means for resisting axial separation of said interconnected ball and socket members under applied tension between said shaft sections.

3. The articulated, flexible shaft assembly as claimed in claim 1, wherein said means interposed between said ball and socket members for effecting driving engagement between said shaft sections comprise at least one driving/locking member mechanically interposed between said ball and socket members and said means for causing said shaft sections to lock up in axial straight alignment when torqued in one direction and to transmit torque in the other direction with limited free angular inclination between said shaft sections comprises at least one driving/locking pocket within one of said ball and socket members in operative engagement with said at least one driving/locking member.

4. The articulated, flexible shaft assembly as claimed in claim 2, wherein said means interposed between said ball and socket members for effecting driving engagement between said shaft sections comprise at least one driving/locking member mechanically interposed between said ball and socket members and said means for causing said shaft sections to lock up in axial straight alignment when torqued in one direction and to transmit torque in the other direction with limited free angular inclination between said shaft sections comprises at least one driving/locking pocket within one of said ball and socket members in operative engagement with said at least one driving/locking member.

5. The articulated, flexible shaft assembly as claimed in claim 4, wherein: said shaft sections each comprise an outer sleeve member concentrically surrounding an inner core member and the inner periphery of the sleeve member and the outer periphery of the core member comprise circumferentially spaced spline ribs and slots with the ribs and slots of said sleeve member and said core member being respectively interengaged, a plurality of driving/locking members are integral with said ball member and constitute circumferentially spaced radial projections thereof, and wherein the spline ribs of said sleeve members carry recesses within one side thereof which constitute multiple driving/locking pockets within the sleeve members, and wherein said recesses of the interconnected adjacent shaft sections receive the lugs of said ball members.

6. The articulated, flexible shaft assembly as claimed in claim 5, wherein said recesses within the spline ribs of said socket member are of irregular rectangular radial plan configuration including planar end walls and a conical sidewall, and said lugs of said ball members are of similar size and configuration to said recesses and constitute laterally opposed sidewalls of oppositely diverging conical configuration and planar end walls, such that when said shaft sections are locked up, the conical sidewalls of said lugs contact the conical sidewalls of said recesses and the planar end walls of said lugs are in contact with the planar end walls of the recesses receiving the same.

7. The articulated, flexible shaft assembly as claimed in claim 6, wherein said core member comprises at one end said ball member and at its opposite end is spherically concave to form a universal joint contact surface for the spherical end of said ball member at an area axially spaced from said lugs, and the opposite end of the sleeve member of each shaft section constitutes the socket member, and wherein respective ends of said sleeve member carry internal and external spherical contact surfaces for shaft section transmission of forces regardless of whether the axes of respective shaft sections are aligned or misaligned.

8. The articulated, flexible shaft assembly as claimed in claim 7, wherein a split, cylindrical pin projects transversely through aligned bores within said sleeve member and said core member for axially locking said splined core member to said sleeve member.

9. The articulated, flexible shaft assembly as claimed in claim 7, wherein a hole is drilled radially completely through said sleeve member and said radial hole is filled with weld material to weld said core member to said sleeve member for each shaft section to prevent axial shifting of said core member with respect to said sleeve member.

10. The articulated, flexible shaft assembly as claimed in claim 4, wherein said shaft sections are of unitary construction and comprise on respective ends, integral ball and socket members, and wherein a plurality of balls are interposed between interconnected ball and socket members of respective shaft sections and constitute said driving/locking members carried by the socket members of said shaft sections, and a plurality of multifacet spherical recesses are formed within the spherical surface of said ball members forming said driving/locking pockets for selectively receiving said balls during shaft section rotation relative to each other to permit torque transmission with the shaft sections axially locked for rotation in one direction and for limited angular inclination when the shaft sections are rotated relative to each other in the opposite direction.

11. The articulated, flexible shaft assembly as claimed in claim 10, wherein said balls are freely, partially received within spherical recesses within the inner periphery of said socket members within the face of the socket member which receives the ball member of the adjacent shaft section, and said means for resisting axial separation of the shaft sections under applied tension comprise a split ring mounted within a groove of said socket member.

12. The articulated, flexible shaft assembly as claimed in claim 4, wherein a plurality of circumferentially spaced radially projecting lugs on the face of the ball member constitute said driving/locking members for one shaft section, and a plurality of generally T-shaped slots extending axially from the opposite end of said one shaft section and within said socket member and constitute said driving/locking pockets, said pockets receiving said lugs of the ball member of the adjacent, interconnected shaft section.

13. The articulated, flexible shaft assembly as claimed in claim 12, wherein said means for resisting axial separation of the shaft sections under applied tension comprise circumferentially extending, radially inward projections on the surface of the socket member facing the inserted ball member of the adjacent shaft section, and wherein the diameter of said socket member at said radial projection is slightly smaller than the diameter of said ball member of the adjacent shaft section such that the portions of said socket member between said L-shaped slot comprise fingers which are flexed radially outwards during insertion of the ball member of the adjacent shaft section to effect a "snap in" fit of one shaft section to another to form the articulated, flexible shaft assembly.

* * * * *